United States Patent
Naimark et al.

(10) Patent No.: US 12,069,408 B2
(45) Date of Patent: Aug. 20, 2024

(54) SYSTEMS AND METHODS FOR INTERPOLATIVE THREE-DIMENSIONAL IMAGING WITHIN THE VIEWING ZONE OF A DISPLAY

(71) Applicant: SHANGHAI NEW YORK UNIVERSITY, Shanghai (CN)

(72) Inventors: Michael Naimark, Berkeley, CA (US); Cameron Ballard, Shanghai (CN); Bruce Luo, San Mateo, CA (US); David Santiano, San Francisco, CA (US); Grace Huang, Shanghai (CN); Mateo Juvera Molina, Shanghai (CN); Ada Zhao, Boulder, CA (US)

(73) Assignee: NYU SHANGHAI (CN)

( * ) Notice: Subject to any disclaimer, the term of this patent is extended or adjusted under 35 U.S.C. 154(b) by 108 days.

(21) Appl. No.: 17/604,333

(22) PCT Filed: Apr. 15, 2019

(86) PCT No.: PCT/CN2019/082642
§ 371 (c)(1),
(2) Date: Oct. 15, 2021

(87) PCT Pub. No.: WO2020/210937
PCT Pub. Date: Oct. 22, 2020

(65) Prior Publication Data
US 2022/0217301 A1 Jul. 7, 2022

(51) Int. Cl.
*H04N 7/14* (2006.01)
*G06T 7/521* (2017.01)
(Continued)

(52) U.S. Cl.
CPC ............. *H04N 7/144* (2013.01); *G06T 7/521* (2017.01); *G06T 7/55* (2017.01); *H04N 23/661* (2023.01);
(Continued)

(58) Field of Classification Search
CPC ...... H04N 7/144; H04N 23/661; H04N 23/90; G06T 7/55; G06T 7/521; G06T 2207/10028; G06T 2207/10048
(Continued)

(56) References Cited

U.S. PATENT DOCUMENTS 6,724,417 B1   4/2004 Hillis et al.
9,681,096 B1 * 6/2017 Motta ...................... H04N 7/18
(Continued)

FOREIGN PATENT DOCUMENTS

CN   102254299 A   11/2011
CN   102480628 A    5/2012
(Continued)

OTHER PUBLICATIONS

International Search Report & Written Opinion for PCT/CN2019/082642 dated Jan. 21, 2020, 12 pages.

*Primary Examiner* — Binh Kien Tieu
(74) *Attorney, Agent, or Firm* — FOLEY & LARDNER LLP

(57) ABSTRACT

Methods and systems for three-dimensional video capture are provided. A plurality of cameras (112) attached to a frame (108), each camera (112) configured to generate a three-dimensional array of pixels of a viewing zone of a display (110), may provide the arrays to an interpolator (122) executed by a processor (116) of a device (100). The interpolator (122) may combine the plurality of three-dimensional arrays of pixels from the plurality of cameras (112) into an output three-dimensional array of pixels for (Continued)

rendering locally at a display (110) or transmission to a remote device (102) for rendering at a display (110) of the remote device (102).

14 Claims, 7 Drawing Sheets

(51) Int. Cl.
*G06T 7/55* (2017.01)
*H04N 23/661* (2023.01)
*H04N 23/90* (2023.01)

(52) U.S. Cl.
CPC ... *H04N 23/90* (2023.01); *G06T 2207/10028* (2013.01); *G06T 2207/10048* (2013.01)

(58) Field of Classification Search
USPC ........................................................ 348/14.16
See application file for complete search history.

(56) References Cited

U.S. PATENT DOCUMENTS

| | | | |
|---|---|---|---|
| 10,182,216 B2* | 1/2019 | Mullis | H04N 5/265 |
| 2003/0218672 A1 | 11/2003 | Zhang et al. | |
| 2010/0322516 A1* | 12/2010 | Xu | G06V 20/53 |
| | | | 382/173 |
| 2018/0136486 A1* | 5/2018 | Macnamara | G16H 50/20 |
| 2018/0255282 A1* | 9/2018 | Chen | H04N 1/00007 |
| 2018/0316877 A1* | 11/2018 | Gruenke | G06T 7/73 |
| 2020/0105013 A1* | 4/2020 | Chen | G06V 40/166 |
| 2020/0162724 A1* | 5/2020 | Neser | G01S 19/01 |
| 2021/0168306 A1* | 6/2021 | Lin | G02B 7/182 |
| 2022/0109815 A1* | 4/2022 | Kang | H04N 13/324 |

FOREIGN PATENT DOCUMENTS

| | | |
|---|---|---|
| CN | 102710919 A | 10/2012 |
| CN | 103945208 A | 7/2014 |
| CN | 104782122 A | 7/2015 |
| CN | 105474633 A | 4/2016 |
| CN | 105917292 A | 8/2016 |
| CN | 106981078 A | 7/2017 |
| CN | 108370431 A | 8/2018 |
| CN | 108463787 A | 8/2018 |
| CN | 109274921 A | 1/2019 |
| CN | 109565567 A | 4/2019 |

* cited by examiner

SYSTEMS AND METHODS FOR INTERPOLATIVE THREE-DIMENSIONAL IMAGING WITHIN THE VIEWING ZONE OF A DISPLAY

CROSS-REFERENCE TO RELATED PATENT APPLICATIONS

The present application is a U.S. National Phase of PCT Application No. PCT/CN2019/082642, filed Apr. 15, 2019, the contents of which are incorporated herein by reference.

FIELD OF THE DISCLOSURE

This disclosure generally relates to systems and methods for three-dimensional imaging. In particular, this disclosure relates to systems and methods for interpolative three-dimensional imaging via transformation and combination of point clouds.

BACKGROUND OF THE DISCLOSURE

Teleconferencing systems typically place a single camera at a position above or near a display to capture an image of a user. However, as the user is not looking into the camera, but rather, at the display, the resulting image does not appear to be looking at the remote viewer. This lack of eye contact with the viewer prevents immersion and impacts the realism of video conferencing compared to real world, face-to-face communications.

Some attempts to overcome this deficiency include placing a camera behind a partially translucent display, though this may add significant volume to the display, as well as adding significant cost to both the camera and display. Other attempts utilize gaze correction or eye-shifting, identifying the user's eyes within the captured image and translating the pixels of the iris and pupil to be centered so that it appears that the image is looking forward at the viewer. However, such implementations may have issues with visual artifacts in or around the eyes of the image, as well as potentially falling in the "uncanny valley", or looking disturbingly inhuman or unreal.

Additionally, single camera teleconferencing systems create two-dimensional or flat images that lack realism, particularly as the viewer shifts their position in front of the display. Stereoscopic cameras and virtual reality displays allow for realistic three-dimensional capture and rendering, but are typically bulky and expensive, and may be impractical for intermittent but frequent use with video conferencing. Other implementations of three-dimensional displays may require specialized glasses (e.g. with different polarization in each lens, or with electrically activated alternating filters to allow a single display running at twice the frame rate to display alternate images to each eye), which are typically expensive and may be similarly impractical for daily use (e.g. requiring users to don glasses for each video call).

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
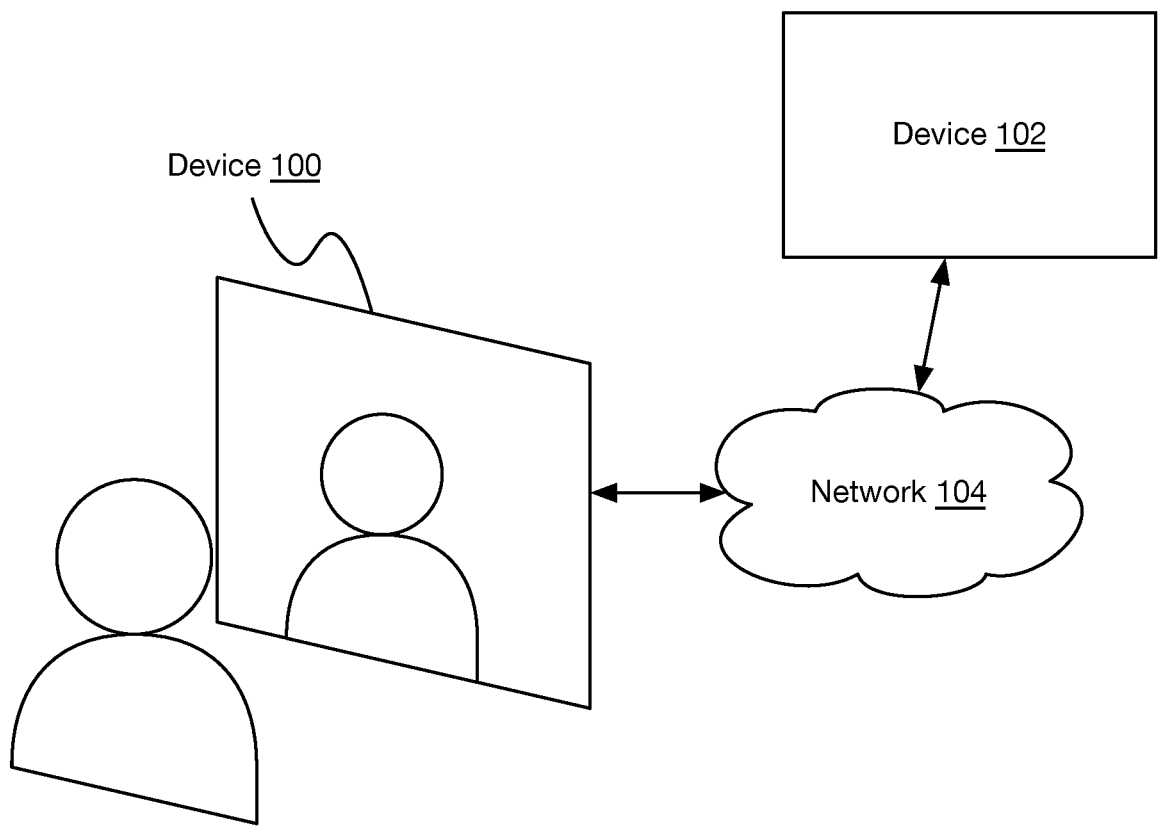
FIG. 1A is an illustration depicting an implementation of video teleconferencing.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for interpolative three-dimensional imaging; and Section B describes a network environment and computing environment which may be useful for practicing embodiments described herein.

A. Systems and Methods for Interpolative Three-dimensional Imaging

With such ubiquitous apps as Skype™ and FaceTime™ and other video conferencing applications, a great many people enjoy live video teleconferencing. But if one steps back and asks "how close is it to real-world, co-present reality?" several big problems stand out.

The first is lack of eye contact. Teleconferencing systems typically place a single camera at a position above or near a display to capture an image of a user. However, as the user is not looking into the camera, but rather, at the display, the resulting image does not appear to be looking at the remote viewer. Similarly, if users consciously look at the camera, they are not looking at the image of the remote user they're talking to and cannot see their eyes (or much detail generally). This lack of eye contact with the viewer prevents immersion and impacts the realism of video conferencing compared to real world, face-to-face communications.

In attempt at a solution, a system may use a display-size half-silvered mirror at a 45-degree angle to the user with the display behind and the camera below (or above, depending on the orientation of the mirror) and perpendicular to the display, so both camera and display are on-axis. However, such solutions require a volume for the combined display and camera having roughly as much depth as the display's height.

Another attempted solution is "gaze correction," whereby the user's face or eyes are computationally rotated to appear to be looking directly into the camera. These solutions may allow for use with a single camera and an underlying model of a human face. However, the model may not apply to every user (e.g. depending on eye spacing, eye height, eye depth, etc., as well as other facial features), and eye positioning may be unpredictable, even with massive databases and deep learning algorithms, resulting in visual artifacts in or around the eyes of the image that may be disturbing to users.

Another attempted solution includes placing a camera behind a partially translucent display, with the camera capturing an image through or between the LCD circuits or other components of the display. This may adversely affect the resolution of both the camera and the display, as well as adding significant cost to both.

The second big problem is lack of three-dimensional (3D) representation and display. Conventional, non-gaze corrected, teleconferencing video is simply two dimensional (2D), with the image coming from a single camera. And conventional displays are also 2D. Since video teleconferencing is by its nature nearfield, as opposed to, say, viewing landscapes or looking out of an airplane window, stereoscopy is essential for immersion and realism, particularly if the viewer shifts their position in front of the display.

The simplest way to make a conventional 2D display stereoscopic requires viewers to wear "3D glasses," either passive (polarizing material) or active (liquid crystal shutters), but this may be expensive and impractical for daily use (e.g. requiring users to don glasses for each video call). Additionally, true 3D also requires proper accommodation (focus), and the degree of realness having stereoscopy without proper accommodation is contestable.

Light field displays deliver true 3D with both stereoscopy and proper accommodation but are currently expensive and in prototype phases today. Also, because they can deliver multiscopic imaging, i.e., the complete range of viewpoints simultaneously, the resolution of each single viewpoint is diluted given the finite number of imaging elements in the display. Specifically, monoscopic imaging may refer to a fixed single point of view of an image, such as the view through a fixed pinhole of a scene. Stereoscopic imaging may refer to a similar view with fixed dual points of view (e.g. one for each eye), giving depth to the resulting image, but lacking the ability to adjust the position of the points of view. Multiscopic imaging may refer to imaging with dynamically adjustable points of view, such as if a viewer moves their head around in front of the image: previously occluded features may become non-occluded and vice versa, allowing the user to lean to look "around" an object within the rendered image. Multiscopic imaging may be either mono (single-eye or single-viewpoint) or stereo (dual-eye or dual-viewpoint), in various implementations.

Stereoscopic cameras and virtual reality displays allow for realistic three-dimensional capture and rendering, but are typically bulky and expensive, and may be impractical for intermittent but frequent use with video conferencing. Additionally, because the upper half of each user's face is obscured by the headset, typical approaches instead use avatars of each user. However, avatars typically lack photorealistic resolution and rely on limited real-time sensing (at best, most of the avatars movements such as lip movement are inferred via audio). Though a sub-community of potential users may find avatars acceptable, even desirable, many find them too "cartoony," at least for everyday and serious video teleconferencing. Technological progress may make avatars more and more photorealistic, but it's unclear if they will achieve real-time camera-based photorealism, especially if users are wearing headsets, even small headsets.

Instead, the systems and methods discussed herein are directed to a glasses-free and headset-less interpolation-based 3D image capture and rendering. A plurality of cameras and, in some implementations, lights, microphones, and speakers, may be positioned around a display, such as a desktop-size flat panel display. Point clouds generated by the cameras are merged into a single streaming 3D rendering, which may be adjusted for eye contact and gaze correction via eye-tracked autostereo and accommodation-changing optics. For example, referring first to FIG. 1A, illustrated is an implementation of a video conferencing system. A device 100, comprising a plurality of cameras and an interpolation engine, may communicate via a network 104 to a second device 102, which may similarly comprise a plurality of cameras and an interpolation engine. One or both devices 100, 102 may comprise a display providing a rendering of the interpolated and merged point clouds of the other device's cameras. Network 104 may comprise any suitable network or combinations of networks, such as local area networks (LANs), wide area networks (WANs) such as the Internet, broadband networks, cellular networks, satellite networks, etc., and may comprise one or more additional devices (e.g. switches, routers, firewalls, network accelerators, etc.).

The system need not utilize inference-based modeling or artificial intelligence systems for smoothing images in many implementations, but rather may render the interpolated and merged point cloud images as a "raw" point cloud (in some implementations, with pixels or voxels large enough to blur or blend into neighboring pixels to provide a more "solid" image). This may significantly reduce processing requirements compared to machine learning based systems.

Although primarily discussed in terms of teleconferencing between two systems, the system may also be used locally as a virtual mirror (allowing for enhancements beyond regular mirrors, such as reversed or non-reflected perspective as well as augmented reality, such as adjustment of hair colors or styles, addition of accessories or makeup, etc.). Additionally, in some implementations, the system may allow for teleconferencing between three or more systems, either by dynamically switching the rendered image according to which user is speaking (e.g. via detection of input audio at the device above a threshold), manually switching the rendered image according to user commands, or rendering multiple user images within a virtual environment rendered at each device (e.g. by truncating or filtering point cloud pixels beyond a predetermined distance in each image to remove a background, such that images from multiple users in different real world environments may be seamlessly merged). Furthermore, although primarily discussed as a live teleconferencing system, in some implementations, captured images or point clouds may be recorded and stored and played back in non-real time.

Figure 1B:
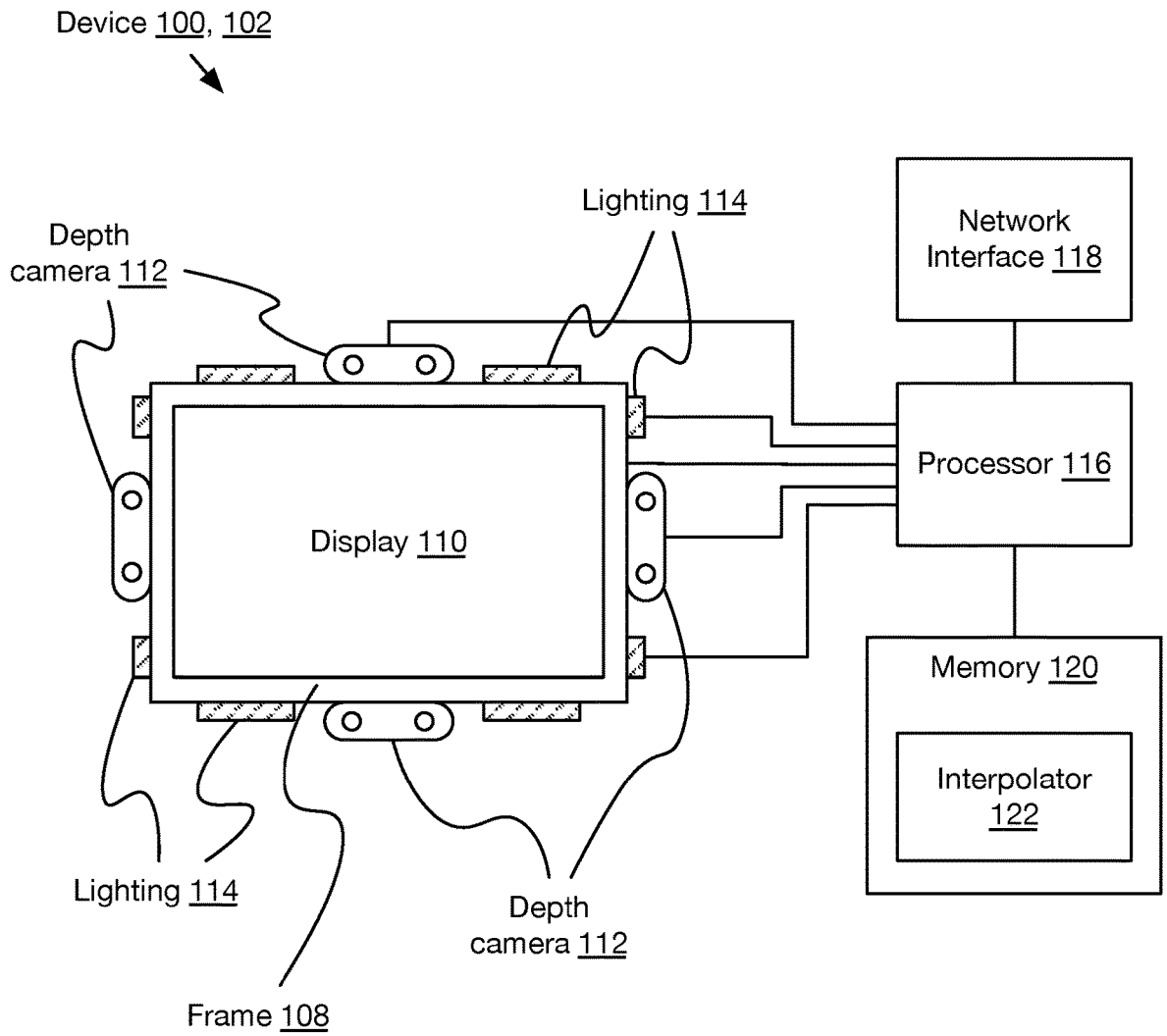
FIG. 1B is a block diagram of an implementation of a device for interpolative three-dimensional imaging.

FIG. 1B is a block diagram of an implementation of a device for interpolative three-dimensional imaging, such as device 100 and/or 102. The device may comprise a frame 108 surrounding a display 110, which may comprise a standard desktop LCD display, flat screen television, portable LCD display (e.g. a tablet computing device), plasma television, front or rear projection screen, or any other type and form of display. Frame 108 may be constructed of any suitable material, such as plastic, metal, or wood, and may be integrated with display 110 in many implementations. For example, frame 108 may comprise a border or bezel of a display 110, such as an integrated bezel of an LCD display.

Frame 108 may support or be attached to a plurality of cameras 112, such as stereoscopic depth cameras (e.g. Intel RealSense™ D415 cameras, or any other type of depth-sensing camera) that integrate passive stereo RGB cameras with structured IR lights and sensors to output point clouds in real time. Although shown as stereo cameras, in some implementations, individual cameras and/or cameras with a lesser or greater number of sensors may be implemented (e.g. a single camera with a separate IR sensor, stereo RGB cameras, stereo RGB cameras plus an IR camera, etc.). Cameras 112 may be centered along the vertical and horizontal sides of the display in some implementations, positioned at the corners of the display, or otherwise placed in predetermined positions.

Although discussed primarily as pixel arrays, in various implementations, the camera outputs may be referred to as point arrays, pixel clouds, point clouds, or other similar features. The outputs may comprise three-dimensional arrays, or may comprise two dimensional arrays with depth values (e.g. only one pixel or point per any x, y coordinate, but each pixel or point associated with a z depth value), with each point or pixel having an RGB (or HSV or similar color encoding value). These depth values may also be calculated after capture, e.g. during post-processing by the device. For example, in two such implementations, depth values may be calculated via parallax calculations for corresponding pixels in an image via outputs from cameras with overlapping viewpoints or from pairs of adjacent cameras.

In another implementation, point cloud data from the plurality of cameras may be used to control or modify a pre-existing model or avatar stored in memory of a destination or remote computing device. For example, a three-dimensional model (which may include a texture map or graphical rendering of a user, or may be an animated figure) may be rendered at a remote device and controlled via the point cloud data (e.g. "puppet-style", moving according to the point cloud data). This may reduce the amount of data transferred between the computing systems, in some implementations. In some implementations, the "skin" or surface of the model may be modified according to the point cloud data, including color and lighting (e.g. providing the texture map or rendering matching the sending user, mapped to a pre-existing three-dimensional model).

In some implementations, frame 108 may also support or comprise one or more lights 114, such as LED lights. These may be used to illuminate the subject (e.g. the user). The lights may be color-controllable to accommodate various lighting effects, may eliminate shadows and make faces appear wrinkle-free and "heavenly" looking, both admittedly desirable qualities for teleconferencing. The frame 108 may also support other components not illustrated, such as microphones (including stereo or spatial microphones), speakers (including stereo or spatial speakers), or other components. For example, high-end omnidirectional stereo microphones and stereo monitor speakers may be placed on each side of the frame or display. Feedback or noise cancelation may be utilized in some implementations, either digitally and/or through careful mic/speaker placement, to reduce extraneous sounds.

Display 110, cameras 112, and other components such as lighting 114 may be connected to a processor 116 of a device 100, 102. Processor 116 may comprise any type and form of processor, including a physical processor a virtual processor executed by a physical processor. Processor 116 may execute various functions including receiving data from cameras 112 and providing data to display 110. In some implementations, data may be received or sent via a network interface 118, such as an Ethernet interface, WiFi interface, cellular interface, or any other type and form of network interface 118 for communicating with a remote device (e.g. 100, 102). Compiled point clouds or arrays of pixels (e.g. having RGB values as well as x, y, and z positional values) may be transmitted via network interface 118 and/or received by network interface 118 in many implementations.

Devices 100, 102 may comprise any type and form of memory device 120, including ROM, RANI, a hard drive, solid state drive, or other such memory. In some implementations, memory 120 may store pixel arrays or point clouds received from cameras 112 for processing and/or an output pixel array or point cloud for rendering via display 110. In some implementations, memory 120 may store an interpolator 122 for execution by a processor 116. Interpolator 122 may comprise hardware, such as an ASIC or FPGA, software, or a combination of hardware and software. Interpolator 122 may comprise an application, server, service, daemon, routine, or other executable logic for receiving point clouds or arrays of pixels from cameras 112, transforming the arrays or point clouds, and combining the arrays or point clouds into an output array or point cloud. In some implementations, interpolator 122 may perform additional transformations on the output point cloud or input point clouds, such as translation or rotation for gaze correction, scaling such that the scale of an input image orthographically matches a display (e.g. providing a real-size image), etc. For example, once the point clouds are combined into a single output point cloud, the system may simulate any viewpoint (e.g. a multiscopic viewpoint) with a virtual camera, including that of a camera directly in front and on-axis with the display and with off-axis projection for perspective correction. Since this is an interpolative approach with sufficient coverage, and since we're assuming a limited viewing region in front of the display, the system may never need to rely on any inference such as occlusion fixes. Additionally, in many implementations, the system need never extrapolate beyond the region covered by the cameras. All single camera solutions, by definition, are extrapolative.

Figure 2:
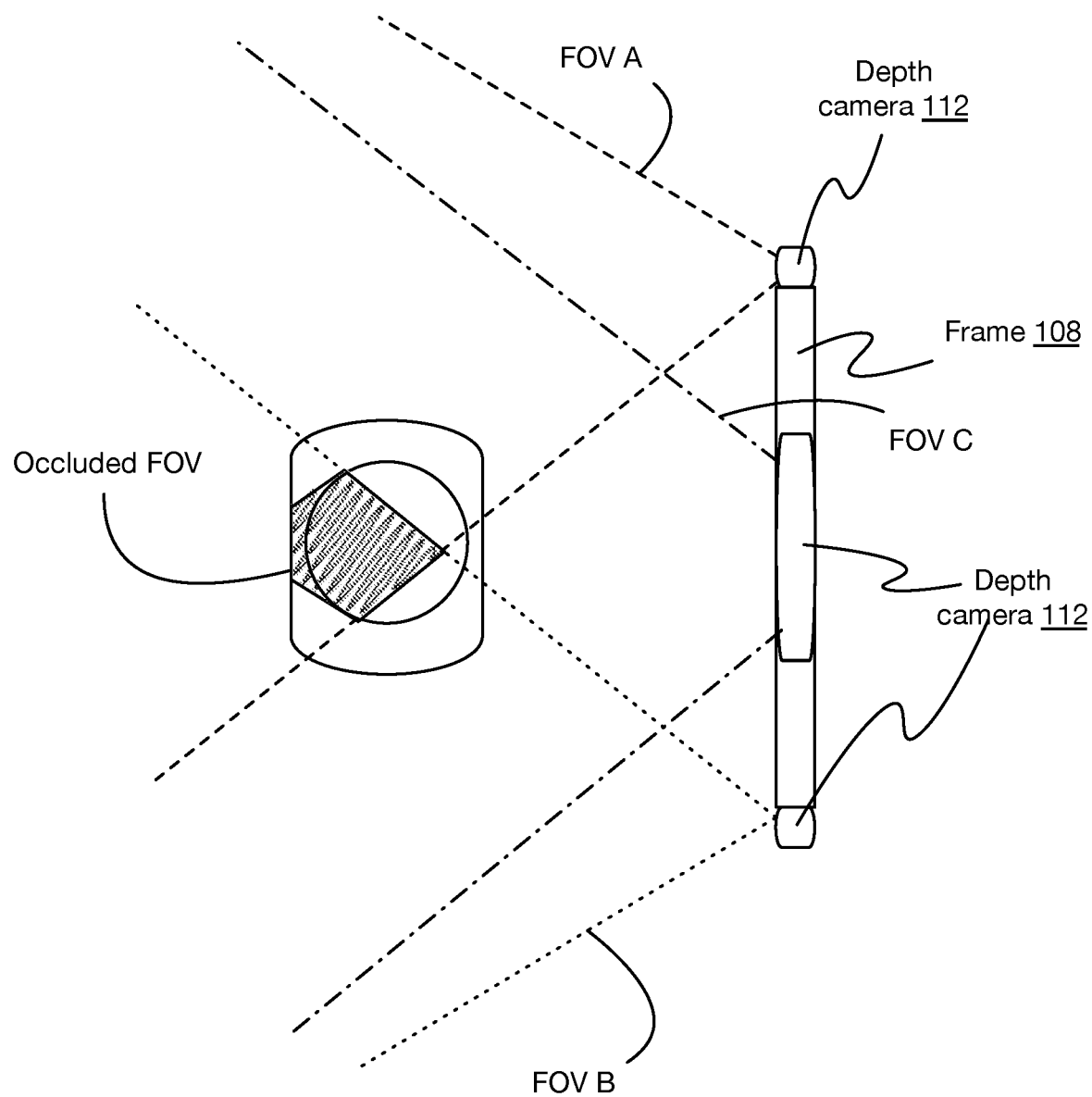
FIG. 2 is an illustration depicting fields of view of a plurality of cameras for an implementation of a device for interpolative three-dimensional imaging.

For example, referring briefly to FIG. 2, illustrated is a top-down view of a frame 108 and cameras 112 in front of a subject, according to some implementations. Example fields of view for each camera are illustrated as bounded with lines of matching patterns (e.g. dashed for field of view A, dotted for field of view B, and dashed and dotted for field of view C. While none of the cameras can view the back of the subject's head (e.g. occluded field of view), there may be no need to render this region: the output point cloud may consist of pixels captured by each camera and/or interpolated between a plurality of corresponding pixels at the same positions.

As discussed herein, interpolation may refer, in various implementations, to additional generated data (e.g. additional pixels or 'virtual' pixels generated based on the real pixels or points captured by the cameras), or may refer to viewpoints that are based on real data as opposed to extrapolated from real data. For example, some machine learning based systems utilizing a single camera may attempt to extrapolate additional pixels or regions outside of the view of the single camera (e.g. adding additional pixels that are shadowed or occluded by features in the view of the camera, based on training data from non-occluded views). By contrast, the systems and methods discussed herein need not utilize extrapolation, but may utilize the multiple cameras with distinct viewpoints to present a three-dimensional model or view of the subject. In some implementations, extrapolation may still be utilized to fill in further views (e.g. the occluded field of view in FIG. 2), including via such machine learning systems.

Returning to FIG. 1B, in some implementations, to align the point clouds or arrays of pixels from each camera, a transformation matrix may be generated and utilized for aligning the arrays, a process referred to herein as registration. The transformation matrix may be generated from a view of known objects within the field of view of the cameras, or a test pattern (e.g. 2D or 3D object printed with a predetermined pattern). Specifically, the objects or test pattern may be placed in front of the cameras and an image taken from each camera. Known features within the objects or test pattern (e.g. edges or vertices of objects, grids or other features in a pattern, etc.) may be identified in each camera image and a transformation matrix generated to align the image from each camera. Because each camera has a known position around the frame, the relative positions may be used as a starting point for the transformation matrix. Various transformation algorithms may be used, including scale invariant feature transforms or simultaneous localization and mapping. In some implementations, registration need not be perfect: pixel sizes within each array or point cloud may be relatively large compared to positional errors in the transformed arrays, such that minor misalignments end up hidden. The transformation matrices may be specific to each camera.

Subsequently, each image from the cameras (point cloud or array) may be adjusted by applying the camera-specific transformation matrix to each pixel of the array from the corresponding camera, aligning the point clouds or arrays within the virtual field of view. In some implementations, the arrays may be directly merged or summed, although this may result in a large number of redundant pixels or points. To reduce the size of the data (particularly useful for teleconferencing with limited bandwidth), redundant pixels may be removed or averaged from the merged array (e.g. pixels from different cameras at the same x, y, z coordinates or within a predetermined threshold range may be removed to leave one pixel, or RGB values from each camera may be averaged to generate a final "merged" pixel). In some implementations, pixels having a depth greater than a threshold may be removed (either from the camera-specific arrays before merging, or from the output array after merging) to remove backgrounds and/or further reduce the data set. In some implementations, pixels may be selectively removed from the merged array in order to maintain a uniform pixel resolution across the output image.

In many implementations, the point cloud rendering may be kept as "raw" as possible with minimum modeling. Specifically, the system may merge and mesh point clouds, and perform filtering, but in many implementations does not add any additional structure or semantics. This ensures that the output appears to be as close to video and as far from "cartoony" as possible.

As discussed above, in some implementations, head and eye tracking may be used to provide a user with the proper perspective and proper multiscopic viewpoint to replicate the viewpoint of looking through an actual window at the remote user or viewer. Additionally, in many implementations, the image scaling is orthoscopically correct, such that the field of view is also equivalent to looking through an actual window, hence the image of the user looks "not too small" and "not too big." Tracking may be implemented via various means, including facial or feature recognition (e.g. pupil tracking), neural network based tracking, or other methods. In some implementations, a single camera of the plurality of cameras may be used for tracking, reducing processing requirements; while in other implementations, multiple cameras may be used for tracking with the tracking data combined (e.g. averaged or merged) to increase accuracy.

In some implementations, interpolator 122 may perform compression, resolution reduction, or other processing to reduce data sizes for transmission to a remote device via network interface 118, e.g. to provide real-time communications via lower bandwidth connections.

Still referring to FIG. 1B, in some implementations, display 110 may comprise a glasses-free 3D display. For example, 2D images may be "aimed" along narrow fields of view which can result in glasses-free, autostereoscopic imagery, such as by using a lenticular lens sheet or parallax barrier film in front of a multiplexed display. Such implementations allow more than two and often as many as twenty or many more images to be multiplexed, resulting in a multiscopic "eye box" of stereoscopic pairs. For non-interactive applications, multiscopic eye boxes look smoother and more pleasing, and can be viewed simultaneously by multiple viewers. The "cost" though, is in resolution, since the more images multiplexed, the less number of pixels which can be dedicated to each image. Accurate, real time eye tracking may be implemented in conjunction with 3D displays, allowing two images to be rendered, one for each eye, with no eye box and additional images, thus minimizing rendering processing and maximizing resolution.

In some implementations, the display 110 may comprise a lenticular lens or screen, e.g. a thin film or sheet such a polymer sheet etched or printed with a pattern of thin lines. In some implementations, a transparent or semi-transparent barrier material (e.g. Lucite, or other such materials) may be placed in front of the lenticular lens or screen, the barrier material having a refractive index such that alternating lines of the rendered image are refracted in different paths to eyes of a viewer at a predetermined position in front of the display. In other implementations, magnifying optics such as a Fresnel lens may be placed in front of the lenticular lens or screen to similarly redirect light from alternating lines of the image to different eyes of the viewer. Additionally, use of the magnifying optics can properly increase accommodation distance of the image, making the image of a remote user in a teleconference appear "life size" and at a proper depth for a viewer. "Screen enlargers" or "screen magnifiers" made with inexpensive Fresnel lenses may transform the screen into appearing both larger and further away. In other implementations, magnification or scaling may be provided by the interpolator, as discussed above.

Furthermore, in some implementations, magnifying or refraction optics in front of the display may be adjustable (manually or dynamically), to change accommodation distances by physically moving the optics closer and further from the display. Though such changes are global, it may allow changing accommodation from being, for example, twice the screen distance for teleconferencing to "infinity" (or near-infinity) for viewing landscapes, as one might see when looking out a window. Additionally, in some implementations, the point clouds or pixels arrays discussed herein may be utilized with light field and/or holographic displays, allowing multiscopic rendering and per-pixel accommodation.

Figure 3:
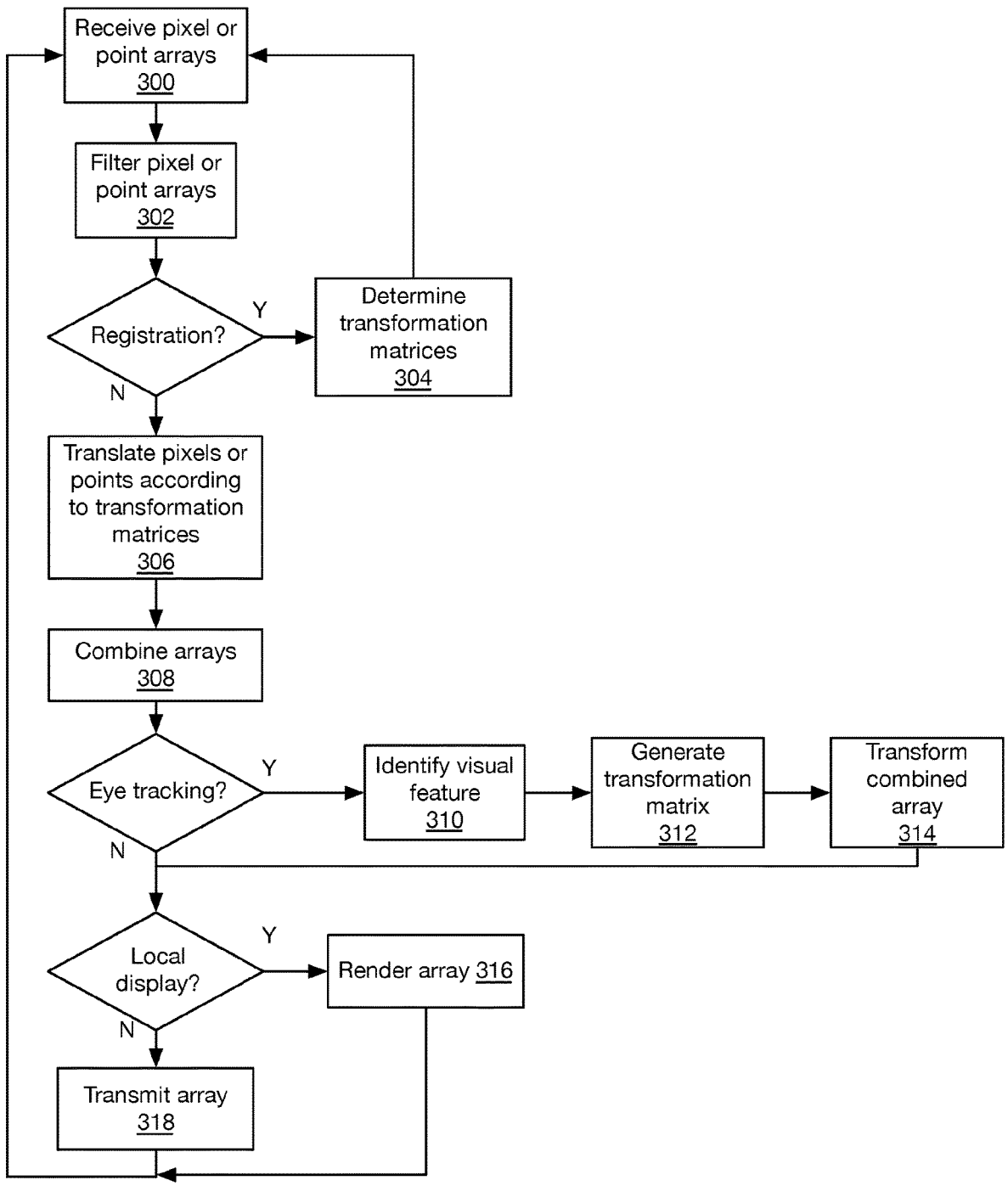
FIG. 3 is a flow chart of an implementation of a method for interpolative three-dimensional imaging.

Referring now to FIG. 3, illustrated is a flow chart of an implementation of a method for interpolative three-dimensional imaging. At step 300, an interpolator or processing device may receive a plurality of pixel arrays or point clouds from a plurality of cameras positioned on a frame at known relative positions, such as around a display. The pixel arrays may comprise two dimensional pixels having RGB values at each point, or three-dimensional point clouds with RGB values at each point, or arrays of depth pixels having x, y, and z coordinates. The pixel arrays may be captured by each camera, which may each comprise a stereo camera and/or IR sensor detecting a pattern provided by an IR projector (either part of one or more cameras or separate from the cameras and mounted on the frame).

In some implementations, at step 302, the pixel arrays may be filtered. For example, in some implementations, pixels with z coordinates beyond a predetermined depth threshold may be removed or truncated to remove or replace backgrounds, reduce the amount of data for processing, etc. In some implementations, this filtering may be done for each array or for a subset of the arrays. Additionally, in some implementations, filtering may be applied with or after combining of arrays at step 308.

In some implementations, to provide registration of the system, at 304, transformation matrices may be generated for each camera-specific point cloud or array. The image captured may be of a known object or objects or pattern, and the interpolator or processing device may generate a transformation matrix for each camera image to align the object or pattern across the arrays. In some implementations, one array may be identified as a default, and the transformation matrix may be an identity matrix or unity matrix, or a transformation step may be skipped for the corresponding array (e.g. from a top center camera, in some implementations).

Once registration is complete and transformation matrices have been generated, or if transformation matrices are provided (e.g. during calibration during manufacturing or other such processes), then the system may be used to record an image (e.g. of a user), repeating steps 300-302. At step 306, each captured array may be transformed via the corresponding transformation matrix (e.g. adjusting x, y, and/or z positions of pixels in the input array according to the transformation). At step 308, the transformed arrays may be merged or combined, e.g. by summing the arrays in some implementations, or by selecting non-redundant pixels from each array (e.g. filtering or removing duplicate pixels or pixels at the same coordinates or within a predetermined range of each other, or by averaging such pixels) in other implementations.

In some implementations, if eye tracking is utilized, then at step 310, the interpolator or processing device may identify a visual feature in the combined array, such as pupils of eyes or other such features. The identification may be via a neural network trained on images of faces, or other such algorithms. At step 312, in some implementations, a gaze correction transformation matrix may be generated to adjust the combined array. The gaze correction transformation matrix may be generated to center the detected eyes or other features within the field of view, and may include translation and rotation of the pixel cloud. At step 314, the transformation may be applied to the combined array.

In some implementations, if the image capture system is being used for local display (e.g. as a virtual mirror), then at step 316, the combined array may be rendered via a display of the device. In some implementations, the combined array may be further adjusted or augmented, e.g. to adjust colors, change features such as hair styles or accessories, or otherwise modify the image. In other implementations, such as where the image capture system is being used for teleconferencing, the combined array may be transmitted to a remote computing device for rendering at a display of the remote computing device at step 318. Transmission of the array may comprise compressing or encoding the array, scaling the array, combining the array with other data, buffering the array for transmission, or other such features.

Accordingly, the systems and methods described herein provide for a self-contained system for real-time display of live-captured point cloud data. The systems provide incorporation of autostereoscopy to allow a 3D view of dynamically updatable static images, as well as providing recording and playback capabilities. The point cloud data is shifted to a single coordinate space that has a 1:1 relationship to the real world to allow for simulated eye-contact. The system may provide a platform independent scene format that stores calibration metrics, point cloud data, RGB frames, and other metadata for storage, playback, and transmission. In various implementations, the point cloud can be stored with or without auto-generated meshes. For streaming or teleconferencing, the system may dynamically adjust scale or resolution to different Levels of Detail (LOD) depending on network speed and device capabilities. In some implementations, the system may provide stereo or spatial sound to improve the realism of playback or teleconferencing. A "bounded region camera view interpolation" application may interpolate a merged point cloud based on a view from multiple cameras, without extrapolating or inferring additional data not captured by at least one camera, reducing processing requirements.

In some implementations, the system may control refresh rates of capture, display, and eye-tracking to maintain smooth autostereoscopic playback. For example, an external clock source that drives an IR dot projector may be asynchronous from an eye tracker IR flood light, to prevent artifacts or other visual interference.

In some implementations, the system may be pre-registered or calibrated, while in other implementations, registration may be dynamically applied responsive to detection of movement of the cameras (e.g. repositioning around the frame, moving the frame to a larger display, etc.). Such detection may be explicit (e.g. via position sensors on the cameras or displays), or implicit (e.g. via capture and analysis of an image of a known pattern or one or more known objects).

The system may comprise an embedded lighting system, which may be calibrated and adjusted to enhance the room lighting or recreate the lighting of the inserted background scene with fine controls of each of the lighting segments. The lighting may be dynamically adjusted during use for white balancing, contrast management, hue adjustment, or other such features. In some implementations, the reflection of the lighting configuration on the user's cornea (and/or other facial features or accessories, such as glasses), sometimes referred to as "catch lighting", may be computationally detected and changed for matching and mood effects.

Implementations of the system may utilize multiple RGB-D data sources for robust and reliable tracking of both eyes with extended coverage, and may accommodate variable numbers of users by tracking the number of eyes and changing the number of views rendered and dividing pixel density accordingly.

In one aspect, the present disclosure is directed to a system for three-dimensional video capture of a viewing zone of a display. The system includes a frame; a plurality of cameras attached to the frame, each camera configured to generate a two or three-dimensional array of pixels; and a processor connected to the plurality of cameras executing an interpolator configured to combine a plurality of two or three-dimensional arrays of pixels from the plurality of cameras into an output three-dimensional array of pixels.

In some implementations, the system includes a network interface in communication with a remote device; and the network interface is configured to transmit the output three-dimensional array of pixels to the remote device for rendering at a display of the remote device. In a further implementation, the system includes a display attached to the frame or positioned inside the frame (e.g. with the frame surrounding the display); and the network interface is further configured to receive a second output three-dimensional array of pixels from the remote device generated from an interpolation of a second plurality of cameras of the remote device, the second output three-dimensional array of pixels rendered at the display.

In some implementations, the system includes a display attached to the frame; and the processor is configured to render the output three-dimensional array of pixels at the display.

In some implementations, the system includes at least one of a lenticular lens and a Fresnel lens attached to the display. In some implementations, each camera of the plurality of cameras comprises a stereo depth camera. In some implementations, the system includes an infrared projector configured to project a predetermined infrared image within a view of the plurality of cameras. In some implementations, each three-dimensional array of pixels comprises a point cloud. In some implementations, the system includes at least one light connected to the frame. In some implementations, the system includes at least one microphone connected to the frame.

In some implementations, the interpolator is further configured to remove a subset of the three-dimensional array of pixels generated by at least one camera of the plurality of cameras. In some implementations, the interpolator is further configured to remove the subset of the three-dimensional array of pixels responsive to a depth value of the pixel being greater than a threshold. In some implementations, the interpolator is further configured to apply an offset, shift, or translation to each pixel of a three-dimensional array of pixels generated by at least one camera of the plurality of cameras prior to combining the plurality of three-dimensional arrays of pixels. In a further implementation, the interpolator is further configured to identify the offset according to a transformation matrix specific to a corresponding camera of the plurality of cameras. In a still further implementation, the interpolator is further configured to generate the transformation matrix for each camera of the plurality of cameras responsive to comparison of a predetermined image to an output of the camera. In some implementations, the interpolator is further configured to: identify a position of a predetermined visual feature in the output three-dimensional array of pixels; generate a transformation matrix based on the position of the predetermined visual feature; and translate each pixel of the output three-dimensional array of pixels according to the transformation matrix.

In another aspect, the present disclosure is directed to a method for three-dimensional video capture of a viewing zone of a display. The method includes receiving, by an interpolator of a computing device, a plurality of three-dimensional arrays of pixels from a corresponding plurality of cameras of a viewing zone of a display of the computing device. The method also includes combining, by the interpolator, the plurality of three-dimensional arrays of pixels from the plurality of cameras into an output three-dimensional array of pixels. The method further includes providing, by the computing device, the output three-dimensional array of pixels for rendering at a display.

In some implementations, the method includes applying, by the interpolator, an offset to each pixel of a three-dimensional array of pixels generated by at least one camera of the plurality of cameras prior to combining the plurality of three-dimensional arrays of pixels.

In some implementations, the method includes identifying, by the interpolator, the offset according to a transformation matrix specific to a corresponding camera of the plurality of cameras. In some implementations, the method includes identifying, by the interpolator, a position of a predetermined visual feature in the output three-dimensional array of pixels; generating, by the interpolator, a transformation matrix based on the position of the predetermined visual feature; and translating, by the interpolator, each pixel of the output three-dimensional array of pixels according to the transformation matrix.

B. Computing and Network Environment

Figure 4A:
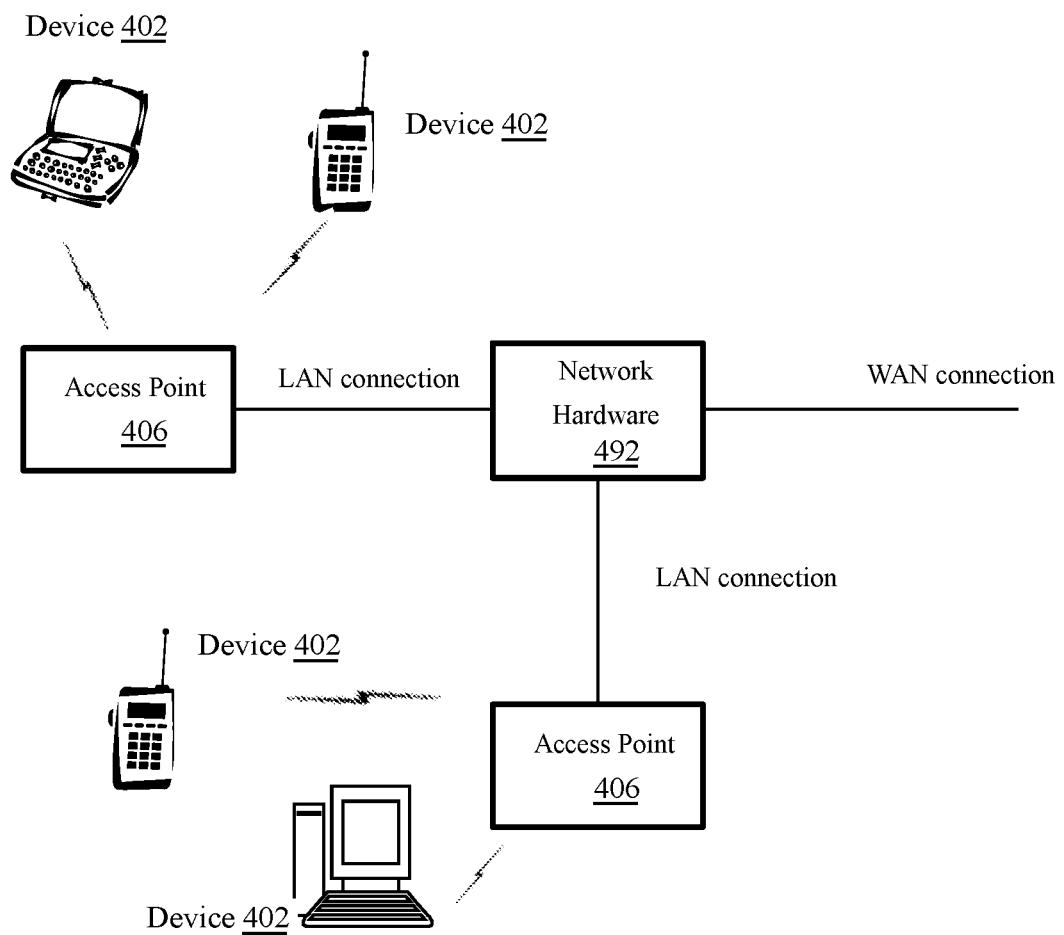
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wired or wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment. In other implementations, the network environment may include a wired communication system (e.g. Ethernet or another wired protocol), and may include corresponding physical switches or hubs, wired physical layer network interfaces, and other such components.

The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a stand-alone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
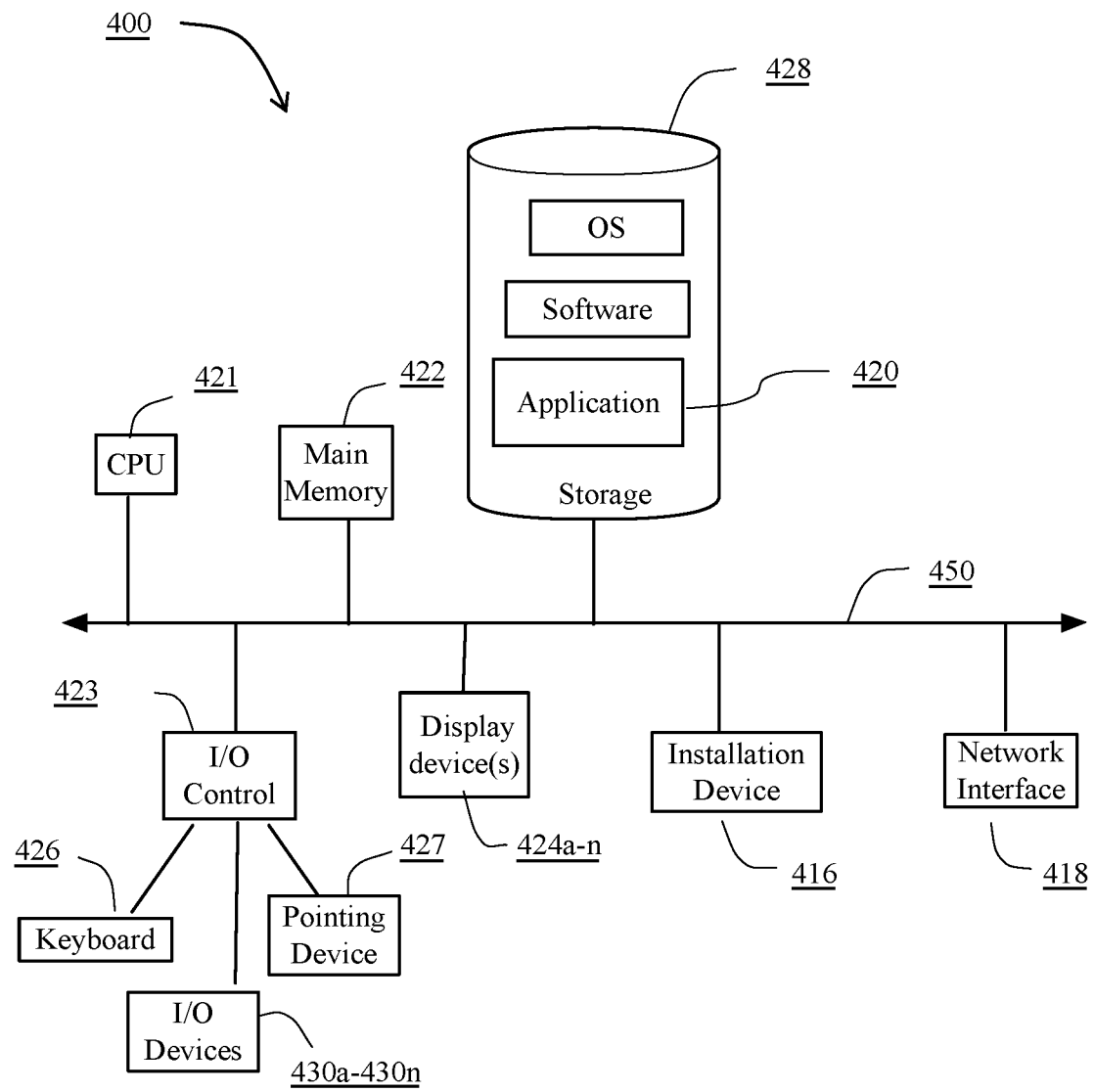
FIGS. 4B and 4C are block diagrams depicting embodiments of computing devices useful in connection with the methods and systems described herein.
Figure 4C:
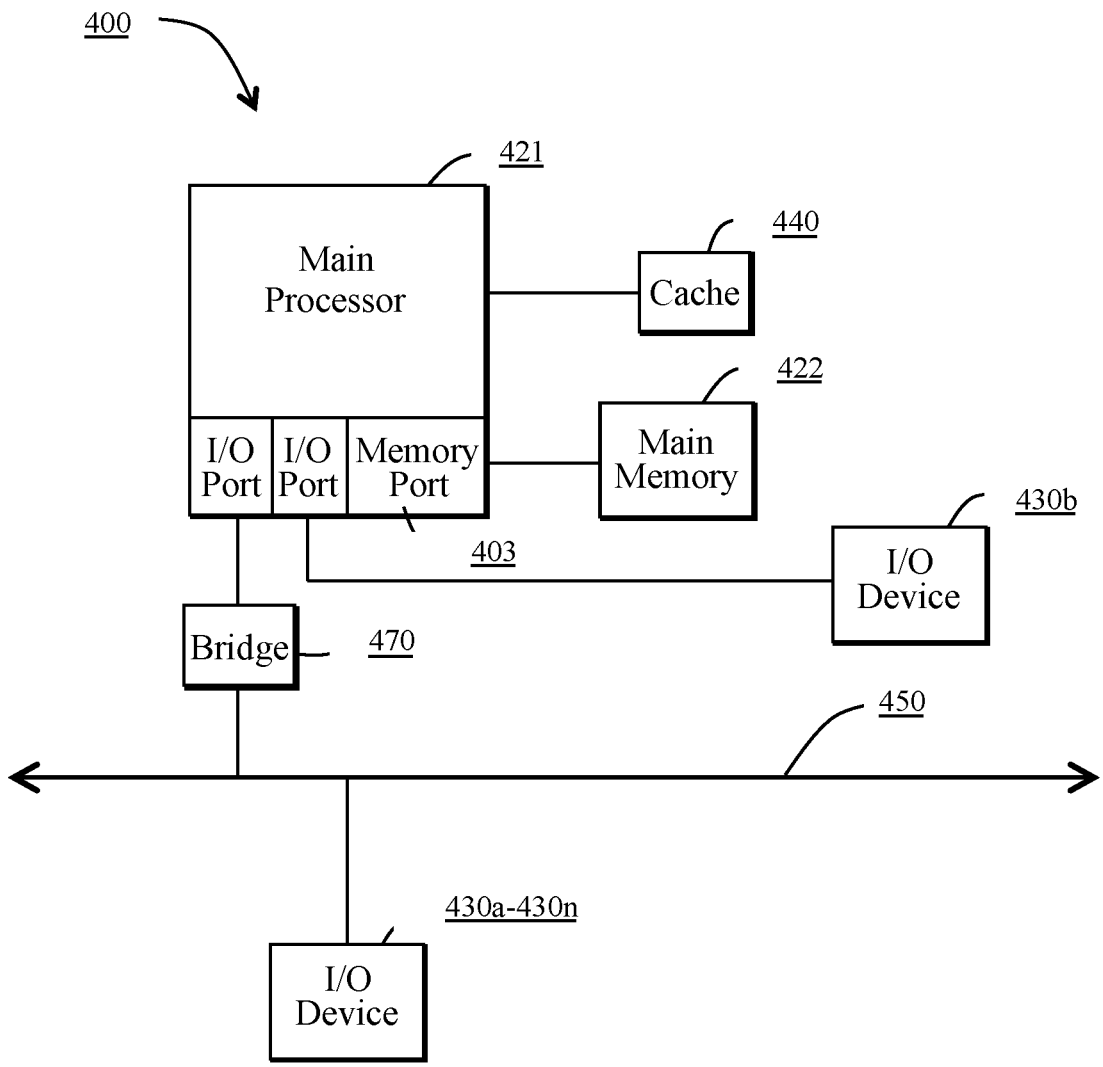

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430b, for example via HYPERTRANSPORT, RAPIDIO, or INFINIBAND communications technology. FIG. 4C also depicts an embodiment in which local busses and direct communication are mixed: the processor 421 communicates with I/O device 430a using a local interconnect bus while communicating with I/O device 430b directly.

A wide variety of I/O devices 430a-430n may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, California.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for three-dimensional video capture within a viewing zone of a display, comprising:
   a frame configured to be positioned surrounding a display;
   a plurality of cameras attached to the frame, each camera configured to generate a two or three-dimensional array of pixels; and
   a processor connected to the plurality of cameras executing an interpolator configured to combine a plurality of two or three-dimensional arrays of pixels from the plurality of cameras into an output three-dimensional array of pixels, the interpolator being further configured to apply an offset or viewpoint shift to each pixel of the two or three-dimensional array of pixels generated by at least one camera of the plurality of cameras prior to combining the plurality of two or three-dimensional arrays of pixels, and wherein the interpolator is further configured to identify the offset or viewpoint shift according to a transformation matrix specific to a corresponding camera of the plurality of cameras, and further wherein the interpolator is further configured to generate the transformation matrix for each camera of the plurality of cameras responsive to comparison of a predetermined image to an output of the camera.

2. The system of claim 1, further comprising a network interface in communication with a remote device; and wherein the network interface is configured to transmit the output three-dimensional array of pixels to the remote device for rendering at a display of the remote device.

3. The system of claim 2, further comprising a display attached to the frame; and wherein the network interface is further configured to receive a second output three-dimensional array of pixels from the remote device generated from an interpolation of a second plurality of cameras of the remote device, the second output three-dimensional array of pixels rendered at the display.

4. The system of claim 1, further comprising a display attached to the frame; and wherein the processor is configured to render the output three-dimensional array of pixels at the display.

5. The system of claim 1, further comprising at least one of a lenticular lens, a Fresnel lens, or other accommodation-modifying lens attached to the display.

6. The system of claim 1, wherein each camera of the plurality of cameras comprises a depth camera.

7. The system of claim 1, further comprising an infrared projector configured to project a predetermined infrared image within a view of the plurality of cameras.

8. The system of claim 1, wherein each three-dimensional array of pixels comprises a point cloud.

9. The system of claim 1, further comprising at least one light connected to the frame.

10. The system of claim 1, further comprising at least one microphone connected to the frame.

11. The system of claim 1, wherein the interpolator is further configured to remove a subset of the three-dimensional array of pixels generated by at least one camera of the plurality of cameras.

12. The system of claim 11, wherein the interpolator is further configured to remove the subset of the three-dimensional array of pixels responsive to a depth value of the pixel being greater than a threshold.

13. The system of claim 1, wherein the interpolator is further configured to:
   identify a position of a predetermined visual feature in the output three-dimensional array of pixels;
   generate a transformation matrix based on the position of the predetermined visual feature; and
   translate each pixel of the output three-dimensional array of pixels according to the transformation matrix.

14. A method for three-dimensional video capture of a viewing zone of a display, comprising:
   receiving, by an interpolator of a computing device, a plurality of three-dimensional arrays of pixels from a corresponding plurality of cameras of a viewing zone of a display of the computing device;
   applying an offset or viewpoint shift to each pixel of the two or three-dimensional array of pixels generated by at least one camera of the plurality of cameras, wherein the interpolator is further configured to identify the offset or viewpoint shift according to a transformation matrix specific to a corresponding camera of the plurality of cameras, and further wherein the interpolator is further configured to generate the transformation matrix for each camera of the plurality of cameras responsive to comparison of a predetermined image to an output of the camera;
   after applying the offset, combining, by the interpolator, the plurality of three-dimensional arrays of pixels from the plurality of cameras into an output three-dimensional array of pixels; and
   providing, by the computing device, the output three-dimensional array of pixels for rendering at a display.

* * * * *